United States Patent [19]

Barnes et al.

[11] Patent Number: 5,121,799

[45] Date of Patent: Jun. 16, 1992

[54] GUIDING AGRICULTURAL VEHICLES

[75] Inventors: Ronny L. Barnes; David A. Gary, both of O'Donnell, Tex.

[73] Assignee: Gar-Bar Corporation, O'Donnell, Tex.

[21] Appl. No.: 226,132

[22] Filed: Jul. 29, 1988

[51] Int. Cl.⁵ .............................................. A01B 69/04
[52] U.S. Cl. ........................................... 172/6; 172/26; 104/244.1; 74/494; 180/131
[58] Field of Search .................. 172/26, 5, 6; 180/131, 180/79; 280/776, 775; 318/580, 587; 74/494, 495; 104/244.1

[56] References Cited

U.S. PATENT DOCUMENTS

| | | | |
|---|---|---|---|
| 1,868,360 | 7/1932 | Knight | 180/131 |
| 3,198,030 | 8/1965 | Miller et al. | 280/775 X |
| 3,279,277 | 10/1966 | Stevens et al. | 280/775 X |
| 3,402,784 | 9/1968 | Roberson et al. | 180/131 |
| 3,611,286 | 10/1971 | Cleveland | 280/776 X |
| 3,648,539 | 3/1972 | Rouis | 74/494 |
| 3,895,545 | 7/1975 | Hunter | 74/494 |
| 4,301,739 | 11/1981 | Mehren et al. | 180/131 X |
| 4,366,756 | 1/1983 | Brum | 104/244.1 |
| 4,367,802 | 1/1983 | Stiff et al. | 180/131 |
| 4,406,232 | 9/1983 | Fasse et al. | 180/131 X |
| 4,453,485 | 6/1984 | Houghton-Brown et al. | 74/494 X |
| 4,607,716 | 8/1986 | Beck | 180/131 |
| 4,640,365 | 2/1987 | Schmidt | 172/26 |

OTHER PUBLICATIONS

Husker Harvest Days Exhibit by Lincoln Creek Manufacturing, Lexington, Neb., Sep. 13, 1990.
TRI-R Innovations, Inc. "Robotic Driver" disclosure, Ralph Baillie-Invention, Sep. 18, 1987.
"Robotic Driver" Sales Brochure, TRI-R Innovations, Inc. Dec. 1988.
"Robotic Driver" Article in Farm Show, vol. 12, No.1, 1988, p. 3.

*Primary Examiner*—Randolph A. Reese
*Assistant Examiner*—Jeffrey L. Thompson
*Attorney, Agent, or Firm*—Wendell Coffee

[57] ABSTRACT

A guidance system for an agricultural tractor includes a furrow feeler which depends from a horizontal shaft so that the shaft rotates about a horizontal axis aligned with the direction of draft. Misalignment causes rotation of the horizontal shaft, which through arms and switches causes an electric motor to turn in a first or second direction as is appropriate to cause the tractor to follow the furrow. The motor is connected by suitable transmission to a yieldable tire which engages the steering wheel of the tractor so that rotation of the tire from the motor will cause the tractor to be steered from the steering wheel. A gauge wheel forms a track furrow so that in future operations, the tractor follows the precise path as before.

8 Claims, 3 Drawing Sheets

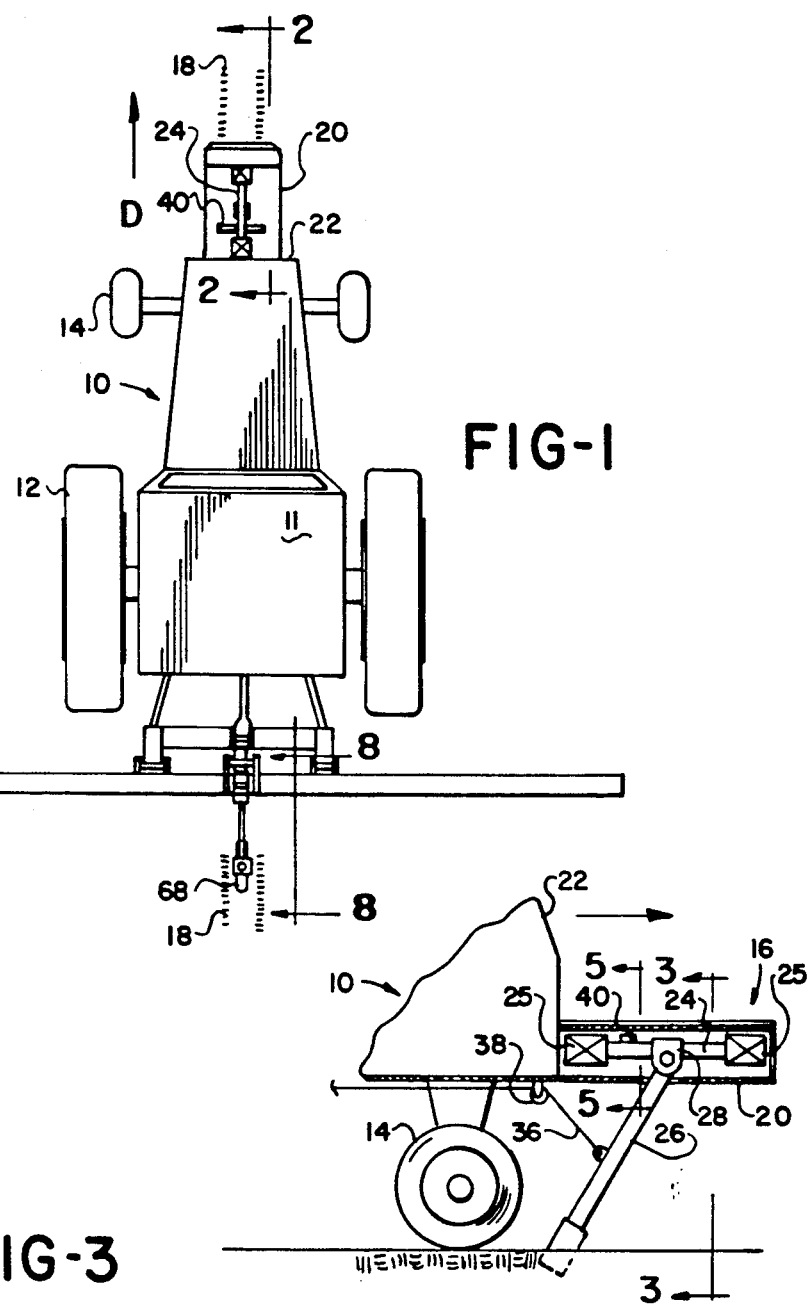
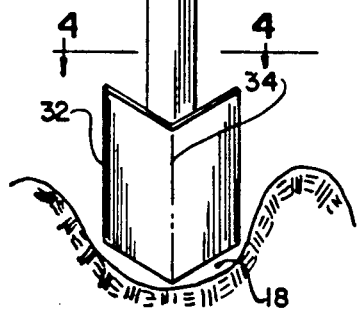
FIG-1
FIG-2
FIG-3

GUIDING AGRICULTURAL VEHICLES

RIGHTS TO INVENTIONS UNDER FEDERAL RESEARCH

There was no federally sponsored research and development concerning this invention.

BACKGROUND OF THE INVENTION (1) Field of the Invention

This invention relates to the land vehicles, and more particularly to guiding agricultural vehicles. It is submitted that a farmer is one having ordinary skill in this art. Therefore, this application is written so that a farmer would be able to make and use the invention.

(2) Description of the Related Art

The need to guide agricultural vehicles has long been recognized and many systems developed for it. An early system on a three wheel tractor configuration was to have a furrow follower pivoted to the axle carrying the front wheels of a tractor. The furrow follower was a pair of discs which were angled forward and downward so that they would naturally follow the furrow. If they stayed in the furrow, they were directly attached to the front wheels of the tractor so that the front wheels of the tractor would follow directly behind them.

Other systems or developements have included feeling fingers which would feel the stalks of growing crops. These fingers would be connected to electrical switches or hydraulic valves by which the tractor would be guided.

Normally the system would be connected to the tie rods of the front wheels or in some cases, to the hydraulic system of the tractor, which would be used with power steering.

In instances where irrigation pipes are mounted upon vehicles, the vehicles may be steered by a furrow follower as indicated above, or in some cases, a system would be used to follow an edge of a dike. In certain cases, the pipe carrying the water to the irrigation system was used as a guide wherein a follower ran along the pipe similar to the followers that ran in the furrows.

In other cases, particularly for irrigation systems, a wire was placed along the desired path. The wire might be above the ground which would have a feeler following the wire. Or in other cases, the wire was buried beneath the ground and followed by electronic sensing devices.

The prior art shows basically three units on a guidance system for agricultural vehicles. These are: (1) means on the vehicles for detecting the relationship of the vehicle and a path to follow, (2) analyzing means on the vehicle for determining steerage correction need as responsive to the means for detecting, and (3) means for steering the vehicle responsive to the analysis of the need responsive.

Basically, the mechanical detection means of the prior art were mounted about an upright or vertical axis, the same as the wheels of the vehicle to be steered. I.e., if the vehicle deviated from the desired path, the follower that followed the desired path would pivot about a vertical axis mounted upon the vehicle.

SUMMARY OF THE INVENTION (1) Progressive Contribution to the Art

This invention relates to a system, a portion of which is improved means and method for following a furrow. I.e., an improved system for detecting the relationship of a vehicle to a path when that path is a furrow. The furrow follower is mounted to rotate or pivot about a horizontal axis. It has been discovered that such a furrow follower has a superior response. In addition, rather than using rotating disc, the invention uses an inexpensive shoe to follow the furrow.

It is contemplated an alternate shoe could be used to straddle the row of crop after the stalks of the row are sufficiently strong to withstand lateral movement. It is contemplated the shoe would be about 24" long and flared at the front to gather in the stalks and align the shoe therewith. The shoe would slide lightly along the top of the ground.

Also, this invention relates to an improved means and method to steer the tractor; specifically, that the tractor is steered by a yieldable tire rotated by an electrical motor. The tire is in direct driving contact with the steering wheel used to steer the tractor. The tire rotates the steering wheel substantially the same as if the steering wheel were being rotated by the human hand.

Finally, because of the improved furrow follower, and the precision by which the system can be made to work, this system contemplates that a particular track furrow be produced each time the tractor cultivates the field. This track furrow is made by a wheel, which would be a pneumatic tire similar to a gauge wheel upon the tool bar. The gauge wheel packs the soil and makes a more sharply defined furrow which results in more precision furrow to follow. Therefore, once the track furrow is laid, the vehicle will follow the same path just as a train follows its track on the railroad.

(2) Objects of this Invention

An object of this invention is to guide an agricultural vehicle along a predetermined path.

Further objects are to achieve the above with devices that are sturdy, compact, durable, lightweight, simple, safe, efficient, versatile, ecologically compatible, energy conserving, and reliable, yet inexpensive and easy to manufacture, connect, adjust, operate and maintain.

Other objects are to achieve the above with a method that is rapid, versatile, ecologically compatible, energy conserving, efficient, and inexpensive, and does not require highly skilled people to connect, adjust, operate, and maintain.

The specific nature of the invention, as well as other objects, uses, and advantages thereof, will clearly appear from the following description and from the accompanying drawings, the different views of which are not scale drawings.

BRIEF DESCRIPTION OF THE DRAWING

FIG. 1 is a top plan view of an agricultural vehicle in the form of a tractor with the invention thereon.

FIG. 2 is a side elevational view, with parts in section for clarity, taken substantially on line 2—2 of FIG. 1.

FIG. 3 is sectional view taken substantially on line 3—3 of FIG. 2.

Figure 6:
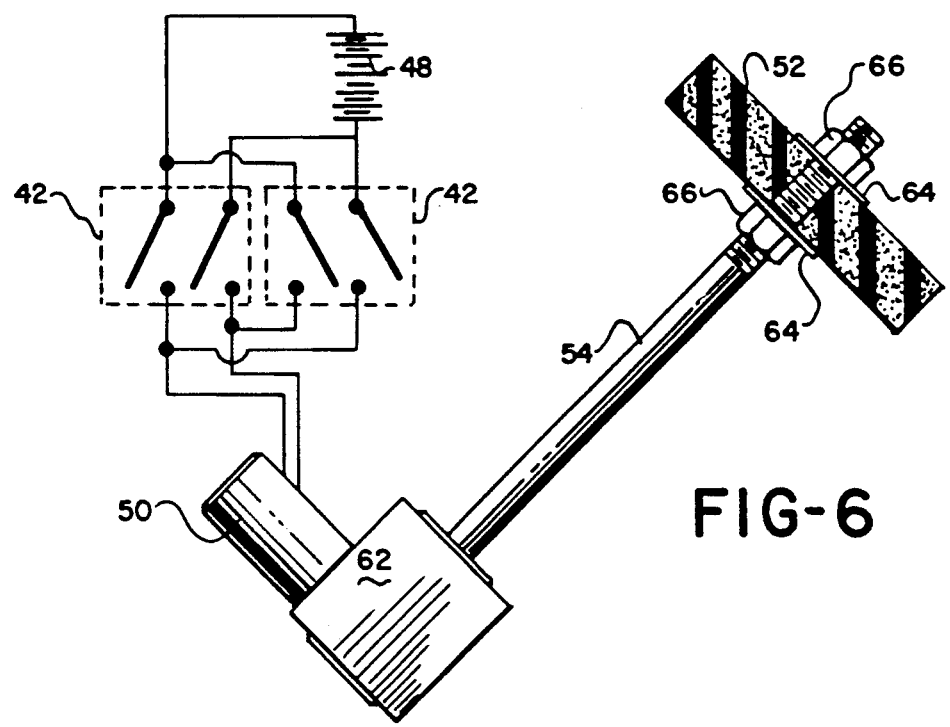
FIG. 6 is a side elevational view with parts in section and other parts schematically shown, showing the switches, electric motor, and yieldable wheel.
Figure 4:
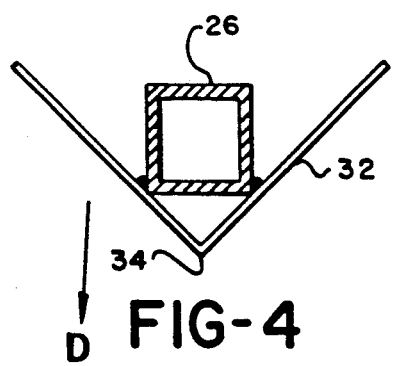
FIG. 4 is a sectional view taken substantially on line 4—4 of FIG. 3.
Figure 5:
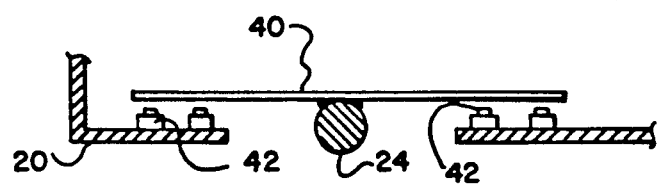
FIG. 5 is a side view, somewhat schematic, taken on line 5—5 of FIG. 2.
Figure 8:
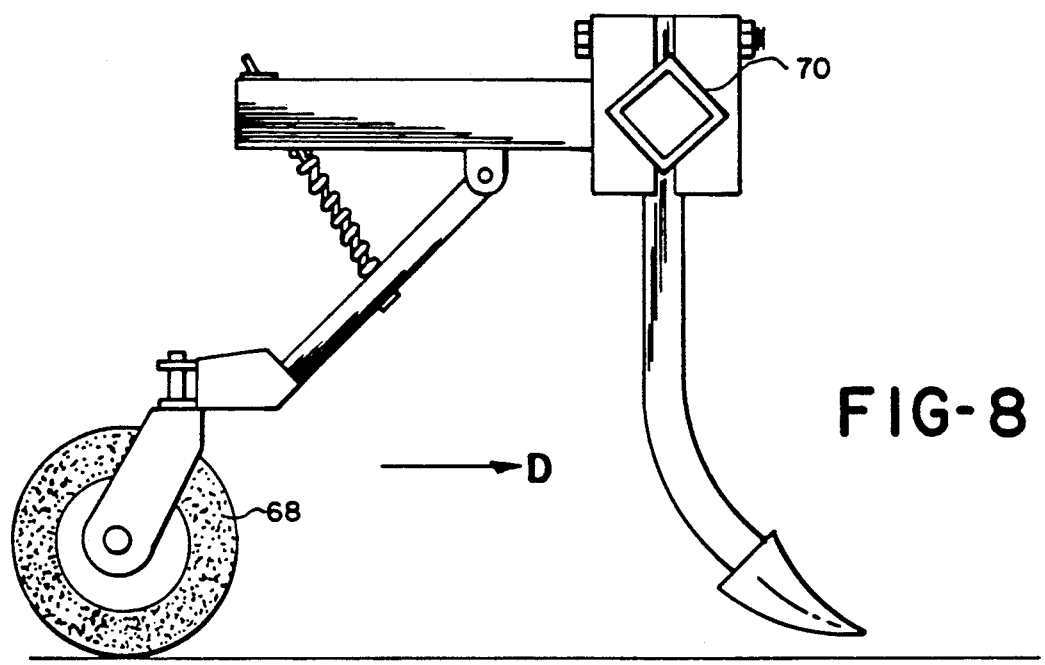
FIG. 8 is a sectional view taken substantially on line 8—8 of FIG. 1 showing the gauge wheel.

As an aid to correlating the terms of the claims to the exemplary drawing, the following catalog of elements and steps is provided:

10: tractor
11: cab
12: wheels
13: steering wheel
14: front wheels
16: detection means
18: furrow
20: bracket
22: front
24: horizontal shaft
25: bearings
26: leg
28: ears
30: bolt
32: foot
34: apex
36: cable
38: pulley
40: cross arm
42: switches
48: battery
50: electric motor
52: yieldable tire
54: shaft
55: tilt mechanism
56: support
62: gear drive
64: washers
66: nuts
68: gauge wheel
70: tool bar
Arrow D

DESCRIPTION OF THE PREFERRED EMBODIMENT

Figure 7:
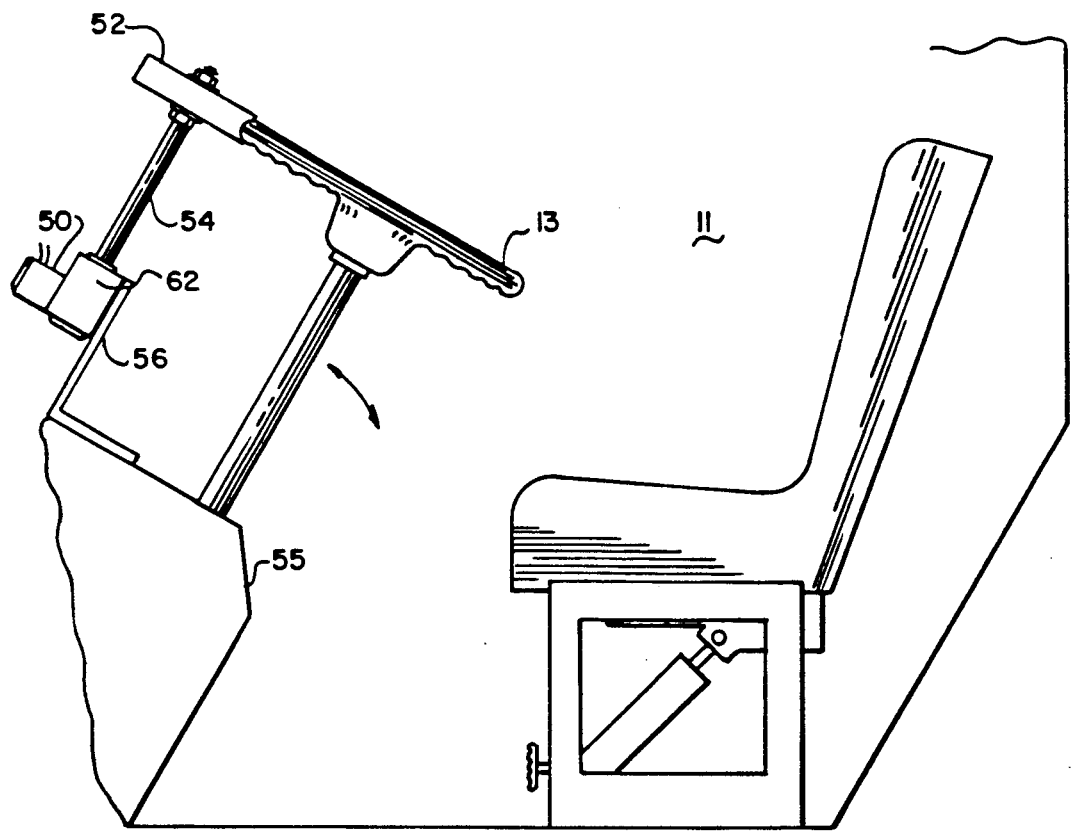
FIG. 7 is a side elevational view within the cab showing the steering wheel and yieldable wheel.

Referring to the drawings there may be seen an agricultural vehicle. The agricultural vehicle is represented by tractor 10 which will have a direction of travel sometimes called a direction of draft shown by arrow "D" in the drawings. The tractor also will have steering wheel 13 in cab 11 (FIG. 7). The tractor will have a plurality of ground engaging wheels 12. The front wheels 14 are steerable by the steering wheel 13. Detection means 16 on the tractor 10 is for detecting the relationship of the vehicle to a predetermined path upon the field upon which the vehicle travels. Normally, the path will be in the form of furrow 18. Also, on the vehicle there will be analyzing means for determining steerage correction needed to respond to the detection means. Finally, there will be a power means on the vehicle for steering the vehicle responsive to the analyzing means.

Those having skill in the art will understand that in broad terms, such vehicle and other forms of detection means, analyzing means, and power means have been known before and used on agricultural vehicles before this invention.

As a detection means, bracket 20 is attached to the tractor 10 and projects forward of the front 22 of the tractor. Horizontal shaft 24 is journaled by bearings 25 to the bracket 20 so that it rotates about its axis, which is horizontal.

The shaft 24 will be aligned in the direction of travel "D".

Rod or leg 26 depends from the horizontal shaft 24. A pair of ears 28 are welded to the shaft 24. Bolt 30 extends through the ears below the shaft 24 so that the axis of the bolt is diametrical of the shaft or lateral to the direction of travel. By saying that the axis is diametrical of the shaft, it is meant that it is parallel to a diameter of the shaft or coincident therewith. The top of the leg 26 has holes through which the bolt 30 passes so that the leg is pivoted to the shaft by the above described pivot means. Preferably, the leg will be about 30° from vertical or 60° from horizontal. It is found that square tubing makes a suitable leg. The leg has furrow follower or foot 32 thereon in the form of an angle iron. The angle iron is welded to the lower portion of the leg so that apex 34 of the angle is in the direction of travel "D".

Cable 36 is attached to the leg 26 adjacent to the foot 32. The cable extends upward to pulley 38 which is attached either to the bracket 20 or the front 22 of the tractor 10. The cable then extends rearwardly until it is attached to tilling attachments on the tractor. The attachment is such that there is provided a lift means for lifting the leg and the foot at any time that the tilling implements upon the tractor are lifted. This is necessary because it is necessary that the tractor not make sharp turns or be in reverse at the time the leg and foot are in the lower position. It will be apparent that if this occurred, the damage would result to the leg or to the bracket supporting it. However, normally on agricultural tractors, it is not possible to cause them to make sharp turns or go in reverse if the tilling equipment on the tractor is in the lower or cultivating position.

It will be noted that the foot 32, if it is in the bottom of the furrow will not deviate to the right or left. However, if the tractor 10 moves so that that foot 32 is against one side of the furrow 18, it will cause the shaft 24 to rotate about its horizontal axis aligned with the direction of travel "D" so that the foot does not move out of the furrow.

Cross arm 40 is attached as by welding to the shaft 24 preferably to the rear of the ears 28. The cross arm will be parallel to the bolt 30, which is to say it, also, will be aligned diametrically of the shaft.

Switches 42 are attached to bracket 20 immediately below the distal ends of the cross arm 40. Therefore, if the foot 32 reaches the edge of the furrow; and therefore, rotates the horizontal shaft 24, it will cause one or the other of the switches to close.

In practice, it has been observed that the leg will tend to bounce upon clods of dirt or unlevel soil in the bottom of the furrow. I.e., the leg normally bounces. When the tractor is misaligned with the furrow, normally there will be somewhat of a bouncing motion of the rotation of the horizontal shaft so that the ends of the arm 40 tend to bounce against the switches 42, which is to say closes them momentarily.

It has been found that starter switches are well adapted to be used as the switches 42. By starter switches, it is meant that switch which is normally mounted on the floorboard of a tractor to be closed by foot pressure to start the tractor. Normally the starter switch is capable of carrying the voltage and high current. Also, it is ruggedly built so it can withstand a large amount of pressure. For proper operation, it is necessary to have a double pole switch. Since starter switches are normally only single pole switches, it has been found desirable to use two switches under each distal end. We find that the two single pole switches are more readily available in rugged construction; and therefore, the two single pole switches are preferable to a single double pole switch.

It will be understood that if the agricultural vehicle is to be used after the crop is harvested or at any time after the crop is grown so that the stalks have sufficient strength to withstand lateral movement, a different shoe would be placed upon the bottom of leg 26. It is contemplated that the shoe, about 24" in length, would ride lightly along the earth and would straddle the row of stalks. The front of the shoe would be flared outward to gather the stalks between it. The two vertical plates which form the shoe which would straddle the crop would have a clearance there between of about 1½, if to be used with cotton. If the shoe were to be used with corn or sorghum or other crops where the stalk is a greater diameter than cotton, it might be necessary to have the plates 3"–4" apart. In any event, the plates will straddle the stalks, and the stalks will slide between the plates, and the stalks will move the shoe and the leg 26. It is also contemplated that a microswitch be used rather than a starter switch as otherwise described.

Electric motor 50 is mounted within the cab 11 of the tractor 10. Electrically, the electric motor 50 is connected to the source of electrical energy of the tractor, which will normally be battery 48. The motor 50 is energized responsive to the closing of the switches 42. The closing of switches on one side will cause the electric motor 50 to rotate in a first direction, and the closing of the other switches will cause the electric motor 50 to rotate in the opposite direction. Such electric motors and the connection thereof is well known to those having ordinary skill in the art.

Yieldable tire 52 is mounted upon shaft 54, which is mounted for rotation within the cab 11 of the tractor. Preferably, the shaft 54 is parallel to the axis of the steering wheel 13 of the tractor 10.

The tire 52 and the steering wheel 13 are in the same plane, and engagement means are provided between the two so that steering wheel and the tire may be brought into peripheral and frictional driving contact. This engagement means is normally in the form of the steering wheel tilt mechanism 55 which is present in most steering wheels of agricultural tractors. In the event the tractor is not equipped with a tiltable steering wheel, the engagement means may well be by a pivotable support 56 holding shaft 54 and the motor 50.

The tire 52 is driven by attaching shaft 54 to gear drive 62 on the electric motor 50. Such gear drives are readily available on the market, normally in combination with the electric motor. Traditionally, the shaft of the electric motor is connected to a worm which drives against the gear of the drive 62 so that the drive 62 rotates much slower than the motor. A speed ratio of 123:1 motor to shaft is satisfactory. The tire is about ⅓ the diameter of the steering wheel so that the reduction between the motor 50 and the wheel 13 is about 369:1.

The yieldable tire 52 might be a pneumatic tire such as used on small vehicles called go-carts or an inflatable wheel barrow tire. However, the preferred form of the yieldable tire 52 is one made of high impact foam rubber. Most conveniently such a tire may be attached to shaft 54 by threading the end of the shaft 54 and placing washers 64 on either side of the yieldable tire 52 and hold them securely in place by nuts 66.

Therefore, when the tractor is not following or aligned with the furrow 18, the foot 32 will cause the cross arm 40 to close one of the switches 42 which will rotate the electric motor 50. This will cause a rotation of the yieldable tire, which, inasmuch as the tire is in contact with the steering wheel 13, will cause a rotation of the steering wheel which will in turn cause a change in the angle of the steerable front wheels 14 of the tractor 10.

Analysis of the mechanism will indicate that the guidance system of the agricultural vehicle includes a feeler or detector means on the vehicle for detecting the relationship of the vehicle and the pre-determined path. This means for detecting the relationship is also a means for detecting mis-alignment. In this particular invention, this takes the form of the foot 32, the leg 26, and the horizontal shaft 24. Once the relationship of the vehicle to the furrow has been detected, there is analyzing means on the vehicle for determining steerage correction needed. This analyzing means is responsive to the detector means. In this particular case, the analyzing means would be the cross arm 40 upon the shaft and the switches 42 with the electric motor which rotates in one direction in response to the closing of one switch and in the other direction to the closing of the other. The correction is also analyzed in the length of time that the switch remains closed or in the frequency by which an instantaneous closure occurs. After the analysis has been made, there is power means on the vehicle for steering the vehicle responsive to the corrections determined by the analyzing means. In this particular embodiment, the power means for making the steering correction includes tire 52, the gear drive 62 of the electric motor 50, and the connections from the gear drive 62 to the steering wheel 13.

Normally, it is desirable to have the agricultural tractor 10 to follow its exact path in each subsequent operation for a growing crop. I.e., if when cultivating or harvesting the crop, the tractor follows the exact path it made when planting the crop, the various tilling and harvesting implements on the tractor may be set with greater precision.

To provide this precision, it is desirable to place gauge wheel 68 upon tool bar 70. Normally the tool bar 70 will carry various tilling equipment. The gauge wheel 68 will press the ground and form a furrow, the sides of which are well defined and packed. If this furrow is made in such a manner, the furrow follower or foot 32 has a better track to follow so that the tractor can be made to follow the precise same path, much the same as if it were following a rail.

The gauge wheel has been shown in the drawing almost in schematic terms. However, it will be understood that normally the gauge wheel will include a pneumatic tire, and the distance the gauge wheel extends below the tool bar can be adjustable. In addition, the gauge wheel is shown spring biased downward. Those having ordinary skill in the art will understand particularly well how to attach gauge wheels to tool bars.

The embodiment shown and described above is only exemplary. We do not claim to have invented all the parts, elements or steps described. Various modifications can be made in the construction, material, arrangement, and operation, and still be within the scope of our invention.

The restrictive description and drawing of the specific examples above do not point out what an infringement of this patent would be, but are to enable one skilled in the art to make and use the invention. The limits of the invention and the bounds of the patent protection are measured by and defined in the following claims.

I claim as my invention:

1. In a guidance system for an agricultural land vehicle to follow a furrow wherein said vehicle has
   a. a direction of travel,
   b. a plurality of wheels, some of which are steerable,
   c. detection means on the vehicle for detecting the relationship of the vehicle and the furrow,
   d. analyzing means on the vehicle for determining steerage correction needed responsive to the detection means; and
   e. power means on the vehicle for steering the vehicle responsive to the analyzing means,
   f. the improved detection means comprises:
   g. a horizontal shaft aligned with the direction of travel,
   h. bearing means connected to the vehicle for journaling the shaft about its axis to the vehicle,
   i. a leg depending from the shaft,
   j. pivot means for pivoting said leg with respect to said shaft about an axis lateral of the direction of travel, and
   k. a cable attached to said leg,
   l. said cable extending to tillage equipment on the vehicle so arranged and forming a portion of a means for lifting the leg responsive to lifting the tillage equipment on the vehicle.

2. The invention as defined in claim 1 further comprising:
   m. a foot forming a furrow follower upon the bottom of the leg.

3. The invention as defined in claim 2 further comprising:
   n. said leg being approximately a 30 degree angle to vertical when said leg is in operation and the foot is in the furrow.

4. The invention as defined in claim 1 further comprising:
   m. a cross bar attached to the shaft diametrically of the shaft,
   n. a bracket on the vehicle supporting said bearing means,
   o. switches on said bracket,
   p. said switches so located that the cross bar forms a portion of means for closing said switches responsive to rotation of the shaft.

5. The invention as defined in claim 4, further comprising:
   q. an electric motor and a source of electrical power connected to said switches so that as the switches on one side of the shaft are activated the motor rotates in a first direction, and as the switches on the other side of the shaft are activated, the motor rotates in the other direction.

6. The invention as defined in claim 5 wherein:
   r. a yieldable tire mounted for rotation is connected to said electrical motor,
   s. said tire is rotated by said electric motor, and
   t. the tire is adapted to be engaged with a steering wheel on the vehicle.

7. The invention as defined in claim 1 further comprising:
   n. tillage equipment attached to the tractor,
   o. a gauge wheel attached to the tractor behind the tillage equipement along the center line of the tractor; thereby making furrow which may be followed the next time vehicle is in the field.

8. In a guidance system for an agricultural vehicle to follow a predetermined path wherein said vehicle has
   a. a direction of travel,
   b. a plurality of wheels, some of which are steerable,
   c. a steering wheel by which the steerable wheels are controlled,
   d. detection means on the vehicle for detecting the relationship of the vehicle and the path, and
   e. analyzing means on the vehicle for determining steerage correction needed responsive to the detection means;
   f. wherein the improvement comprising:
   g. a yieldable tire mounted for rotation adjacent to the steering wheel,
   h. means connected to the yieldable tire for rotating the tire,
   j. said means for rotating the tire responsive to said analyzing means,
   k. engagement means interconnecting the tire and steering wheel for bringing the tire in peripheral and driving contact with the steering wheel,
   l. a horizontal shaft aligned with the direction of travel,
   m. bearing means connected to the vehicle for journaling the shaft about its axis to the tractor,
   n. a leg depending from the shaft, and
   o. pivot means for pivoting said leg to said shaft about an axis lateral to the direction of travel.

* * * * *